United States Patent Office 3,790,604
Patented Feb. 5, 1974

3,790,604
ANTHRAQUINONE COMPOUNDS
Ian Cheetham, Kenneth Dunkerley, Colin William Greenhalgh, and Duncan Adrian Sidney Phillips, Manchester, England, assignors to Imperial Chemical Industries Limited, London, England
No Drawing. Filed May 19, 1972, Ser. No. 254,861
Claims priority, application Great Britain, Feb. 18, 1972, 7,543/72
Int. Cl. C09b *1/10, 1/14*
U.S. Cl. 260—383
1 Claim

ABSTRACT OF THE DISCLOSURE

The anthraquinone compound of the formula:

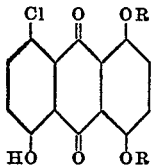

wherein R is hydrogen or lower alkyl, a process for the manufacture of the said compounds, and the use of the said compounds as dyestuffs intermediates.

---

This invention relates to anthraquinone compounds which are valuable as intermediates in the manufacture of anthraquinone dyestuffs.

According to the invention there are provided the anthraquinone compounds of the formula:

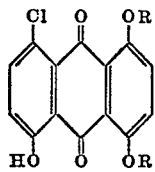

where R is a hydrogen atom or a lower alkyl radical.

The lower alkyl radicals represented by R are alkyl radicals containing from 1 to 6 carbon atoms such as methyl, ethyl, n-propyl, sec-butyl, n-amyl and n-hexyl.

According to a further feature of the invention there is provided a process for the manufacture of the anthraquinone compounds of the invention which comprises treating an anthraquinone compound of the formula:

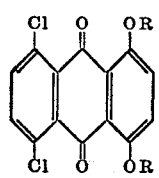

Formual I with an aqueous or alcoholic solution of a quaternary ammonium hydroxide in an inert organic liquid which is a solvent for the anthraquinone compound and in which the said solution is also soluble, R having the meaning stated above.

The process of the invention can be conveniently carried out by stirring the anthraquinone compound, the solution of the quaternary ammonium hydroxide and the inert organic liquid together, preferably at a temperature between 50° C. and the boiling point of the reaction medium. The mixture is then cooled, acidified and the solid which is precipitated is then isolated in conventional manner.

In carrying out the reaction it is necessary to use at least one molecular proportion of the quaternary ammonium hydroxide for each mole of the anthraquinone compound of Formula I. However, when an anthraquinone compound is being used wherein each R is hydrogen then it is preferred that the usage of the quaternary ammonium compound does not exceed 1.2 molecular proportions. In the case of the other anthraquinone compounds (i.e. each R is lower alkyl), then larger amounts of the quaternary ammonium compounds can be used, and in fact such larger amounts are often found to be desirable as the use of such larger amounts is found to speed up the reaction.

As examples of the anthraquinone compounds of Formula I there may be mentioned 5:8-dichloro-1:4-dihydroxyanthraquinone (5:8-dichloroquinizarin) and 5:8-dichloro-1:4-(dimethoxy or diethoxy) anthraquinone.

As examples of the quaternary ammonium hydroxides there may be mentioned tetramethylammonium hydroxide, tetraethylammonium hydroxide, trimethylbenzylammonium hydroxide, triethyldodecylammonium hydroxide and phenyltrimethylammonium hydroxide.

As examples of inert organic liquids there may be mentioned pyridine, β-ethoxyethanol, dimethylsulphoxide and dimethylformamide.

The anthraquinone compounds of the invention are valuable as intermediates in the manufacture of anthraquinone dyestuffs, for example by replacing the chlorine atom by an optionally substituted mercapto or amino group.

The invention is illustrated but not limited by the following examples in which the parts and percentages are by weight.

EXAMPLE 1

A solution of 1 part of tetraethylammonium hydroxide in 4 parts of water is added to a solution of 1.7 parts of 5:8-dichloroquinizarin in 20 parts of dimethylformamide, and the resulting mixture is stirred for 2 hours at 120° C. The mixture is cooled to 80° C., 15 parts of a 2 N aqueous solution of hydrochloric acid are added, the mixture is cooled to 20° C. and the precipitated solid is filtered off, washed with water and dried. The yield of 1:4:5-trihydroxy-8-chloroanthraquinone is 1.3 parts (80%), and the product melts at a temperature above 300° C.

EXAMPLE 2

A solution of 8 parts of trimethylbenzylammonium hydroxide in 20 parts of water is added to a solution of 1 part of 5:8-dichloro-1:4-dimethoxyanthraquinone in 100 parts of dimethylformamide, and the resulting mixture is stirred for 1½ hours at 120° C. The mixture is cooled to 80° C., 5 parts of a 2 N aqueous solution of hydrochloric acid are added, the mixture is cooled to 20° C., and the precipitated solid is filtered off, washed with water and dried. The yield of 5-hydroxy-8-chloro- 1:4-dimethoxyanthraquinone is 80%, and the product melts at 195° C.
We claim:
1. An anthraquinone compound of the formula:
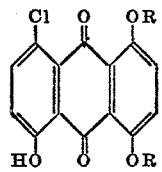
wherein R is selected from hydrogen and lower alkyl.
References Cited
UNITED STATES PATENTS
2,346,772  4/1944  Lulek et al. _____ 260—383
FOREIGN PATENTS
1,575,485  7/1969  France _____ 260—383
OTHER REFERENCES
Frey: Chem. Ber. 45 1358 (1912).
JAMES A. PATTEN, Primary Examiner
R. GERSTH, Assistant Examiner